United States Patent [19]

Comte

[11] 4,406,241

[45] Sep. 27, 1983

[54] DEVICE FOR ABSORBING FRICTION BETWEEN SHIP'S HULLS AND THE QUAY WALLS

[76] Inventor: Robert Comte, Cité Jardin, Toga, 20200 Bastia, France

[21] Appl. No.: 355,541

[22] PCT Filed: Aug. 7, 1981

[86] PCT No.: PCT/FR81/00096

§ 371 Date: Mar. 3, 1982

§ 102(e) Date: Mar. 3, 1982

[87] PCT Pub. No.: WO82/00670

PCT Pub. Date: Mar. 4, 1982

[51] Int. Cl.³ .............................................. B63B 59/02
[52] U.S. Cl. .................................................. 114/220
[58] Field of Search ................ 114/219, 220; 405/212, 405/213, 215; 267/140, 153

[56] References Cited

U.S. PATENT DOCUMENTS

| 2,413,210 | 12/1946 | Blackman | 114/219 |
| 2,562,957 | 8/1951 | Sipken et al. | 114/220 |
| 2,680,859 | 6/1954 | Hultberg | 114/219 |
| 2,952,979 | 9/1960 | Rolando | 114/220 |
| 3,455,269 | 7/1969 | Dean | 114/220 |
| 3,724,413 | 4/1973 | Duncan et al. | 114/220 |
| 3,848,853 | 11/1974 | Way et al. | 114/219 |
| 3,951,384 | 4/1976 | Hildreth, Jr. | 114/219 |
| 4,055,136 | 10/1977 | Fujisawa et al. | 114/219 |

FOREIGN PATENT DOCUMENTS

| 2017662 | 10/1971 | Fed. Rep. of Germany | 114/220 |
| 2032843 | 5/1972 | Fed. Rep. of Germany | 114/220 |
| 2348649 | 4/1975 | Fed. Rep. of Germany | 114/220 |
| 2020436 | 9/1972 | France | 114/220 |
| 2188628 | 1/1974 | France | 114/219 |
| 718624 | 11/1954 | United Kingdom | 114/219 |

*Primary Examiner*—Trygve M. Blix
*Assistant Examiner*—Jesús D. Sotelo
*Attorney, Agent, or Firm*—Young & Thompson

[57] ABSTRACT

The device comprises worn pneumatic tires positioned against one another on a cylindrical metal tube. The tube is filled with light concrete. The worn tires are filled with a low density elastic material. The part of the tires adjacent to the tube is closed off in a water-tight manner by a flexible sleeve. The tube is closed off at its ends by projecting plates which hold the assembly of tires pressed against one another. Used to protect ships' hulls when ships come alongside a quay wall.

13 Claims, 7 Drawing Figures

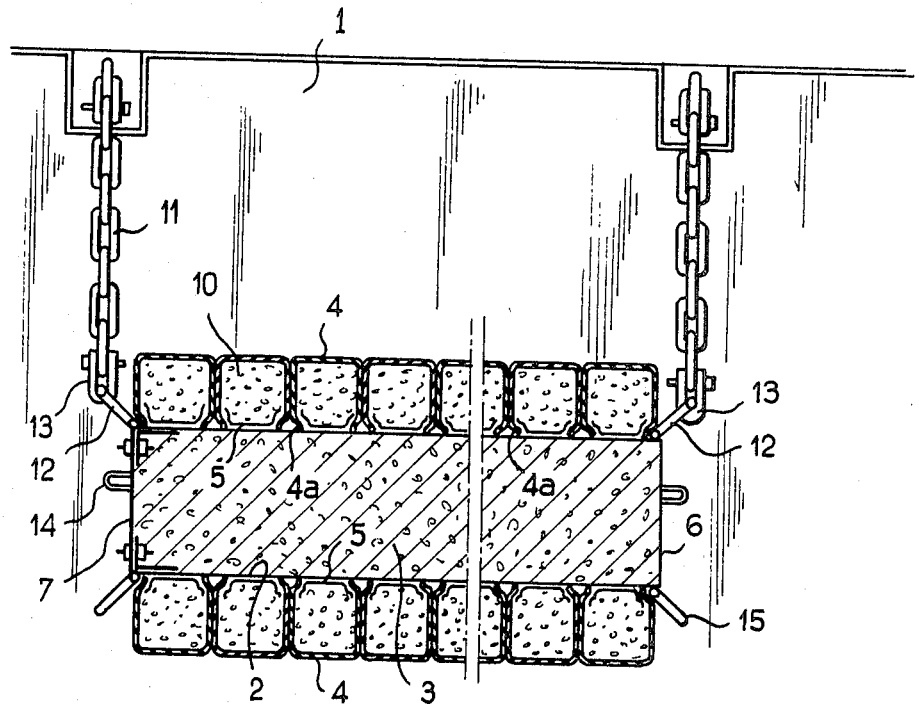
FIG_1
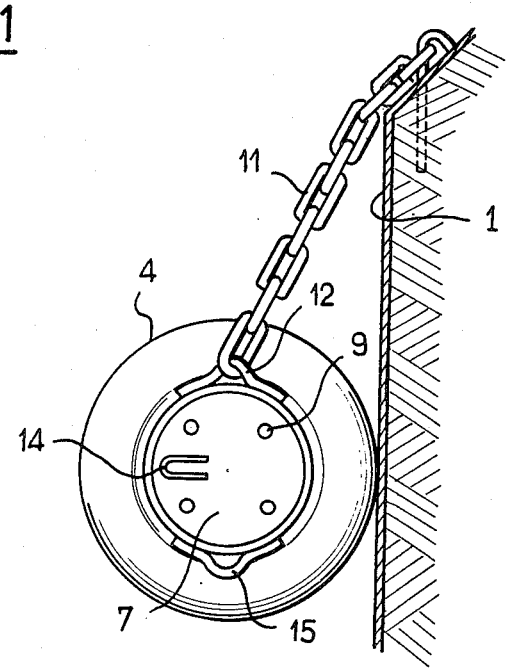
FIG_2

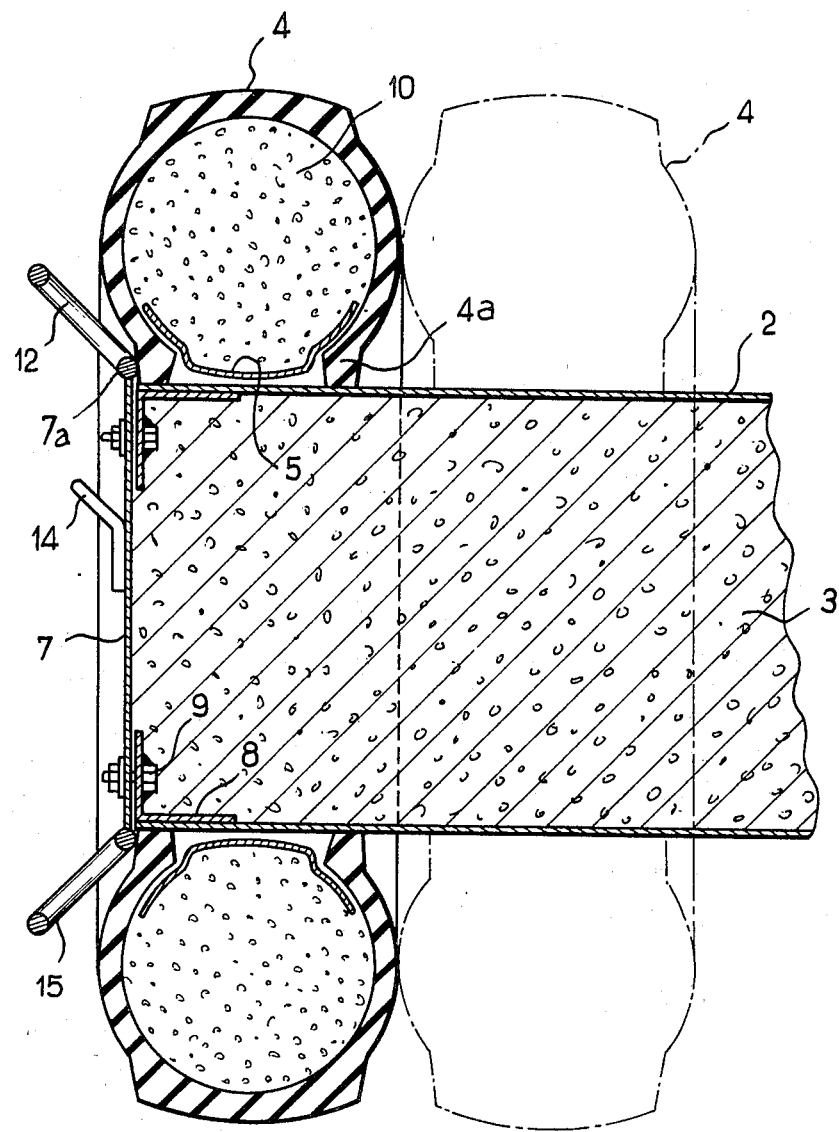
FIG_3

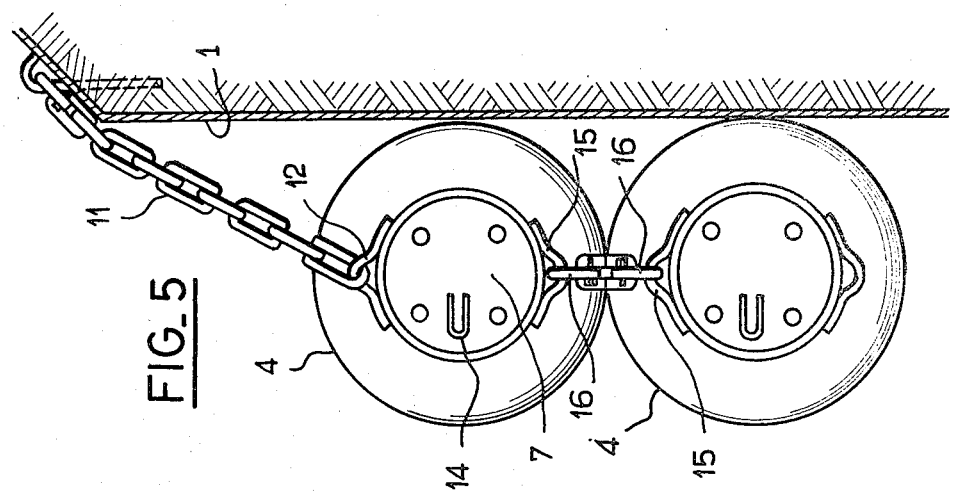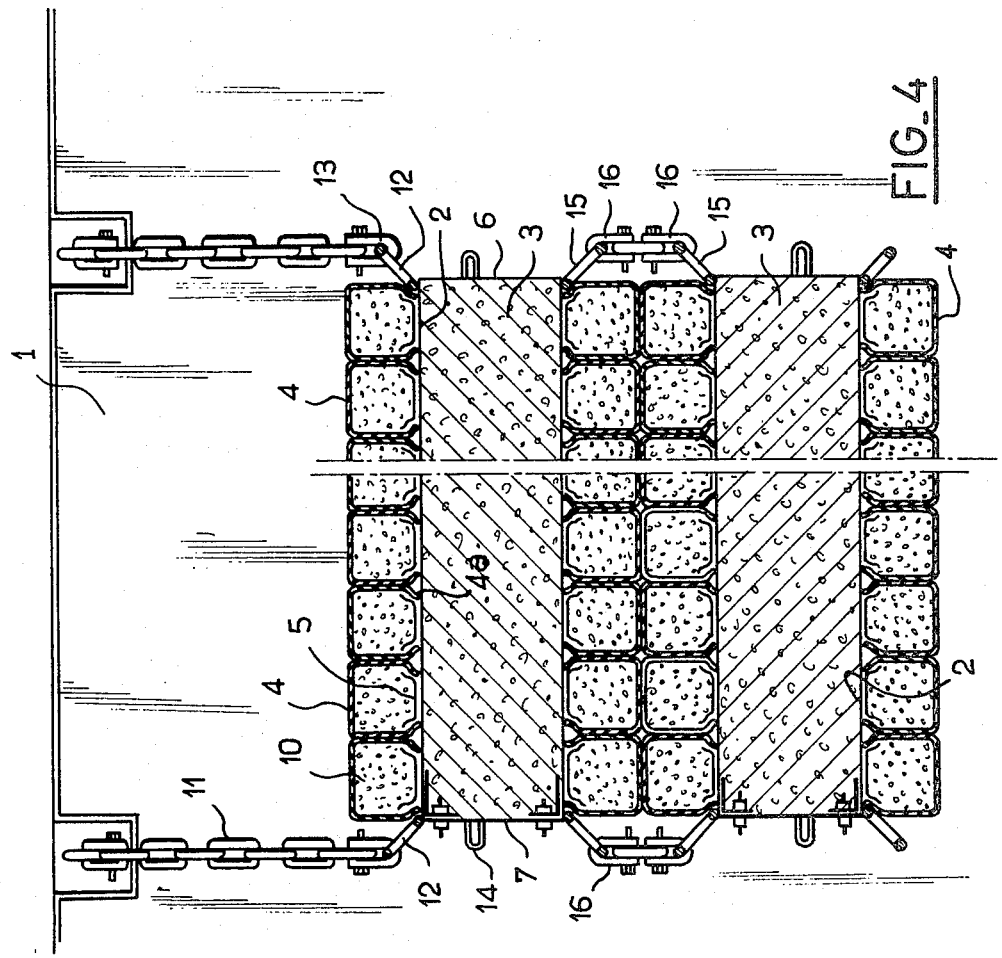

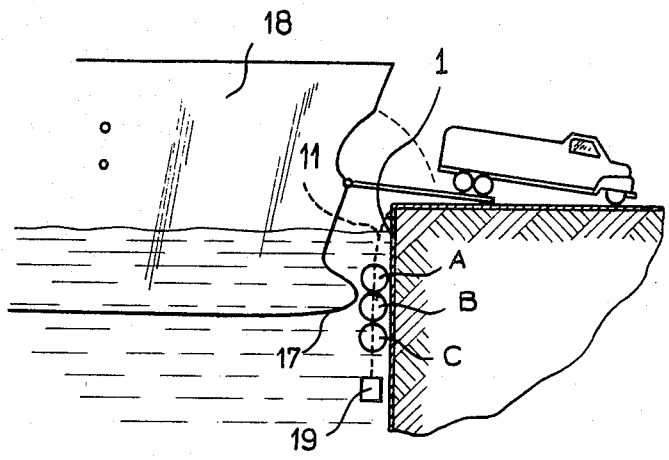
FIG_6
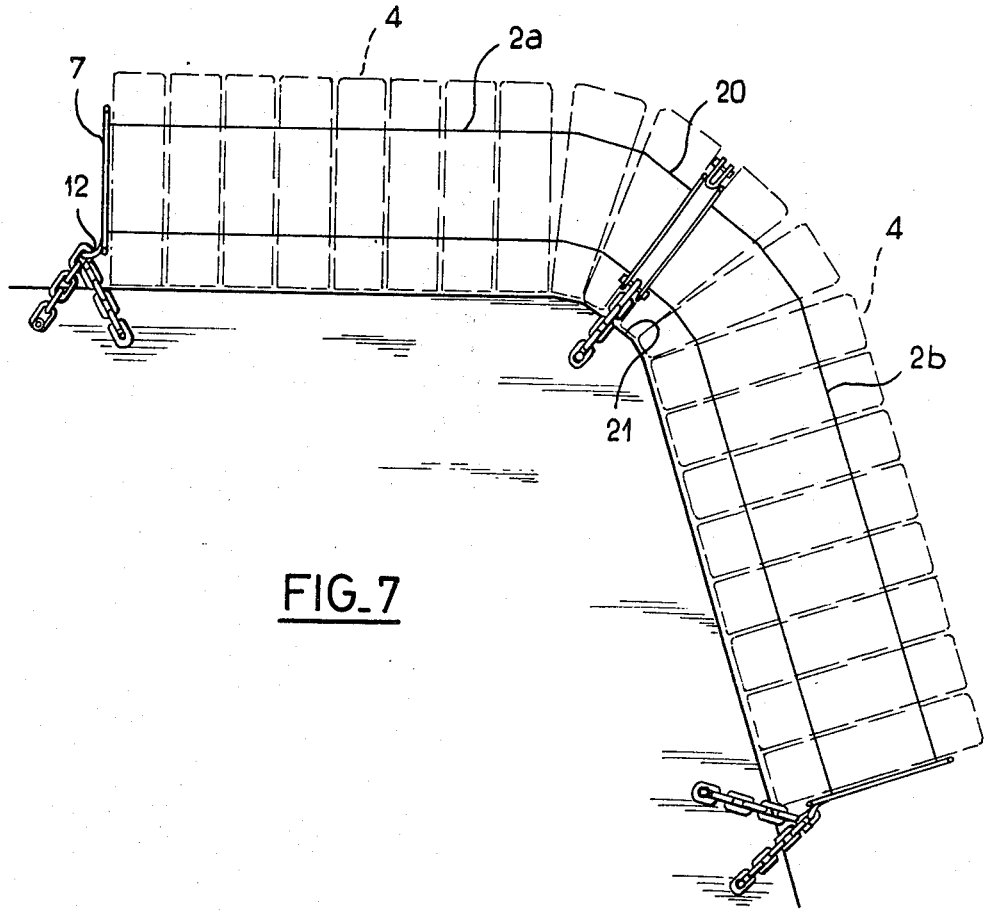
FIG_7

DEVICE FOR ABSORBING FRICTION BETWEEN SHIP'S HULLS AND THE QUAY WALLS

The present invention concerns a device for absorbing friction between ships' hulls and the quay walls of harbours. This type of device is also called a quay fender.

Various types of quay fender are known.

The fender which is closest to the one to which the present invention relates comprises a series of worn pneumatic tires disposed against one another on a wooden beam which is positioned horizontally with respect to the quay wall.

In the working position, the tires rest against the vertical side of the quay wall. They are clamped at the ends of the beam by means of wooden components secured in a perpendicular manner to the beam.

These fenders are unsatisfactory, mainly for the following reasons:

On the one hand, the wood of the beam is quickly damaged by sea-water, so that the fender must be replaced at the end of a relatively short period. In addition, the use of wood is quite unsuitable for utilisation of the fender in a fully submerged state.

Because of this, such a fender is unsuitable for protection of the submerged bulge at the bow of a ship, which is usually called "the bulb".

Moreover, it is virtually impossible to achieve close and uniform contact between the tires and the outer surface of the wooden beam, so that the tires tend to be displaced on the beam with respect to one another, giving rise to rubbing which causes rapid deterioration of the fender.

On the other hand, since it is impossible to ensure water-tightness between the interiors of the tyres and the surface of the wooden beam, the tires cannot easily be filled with a material capable of giving the fender the desired shock-absorbing effect. It is an object of the present invention to overcome the above disadvantages by providing a fender which is simultaneously reliable, effective and inexpensive.

The device to which the invention relates, for absorbing friction between ships and quay walls, comprises a series of worn pneumatic tires disposed against one another on an elongate body intended to be positioned substantially horizontally with respect to the quay wall.

According to the invention, the device is characterised in that the elongate body consists of a cylindrical metal tube filled with concrete lightened by low density fillers, that the worn pneumatic tires are filled with a low density elastic material, that the parts of the pneumatic tires adjacent to the metal tube are closed off in a water-tight manner by flexible sleeves in contact with the metal tube and that the tube is closed off at its ends by means of plates which project with respect to the outer surface of the tube, these projections holding the assembly of tires pressed against one another.

The use of a cylindrical tube allows perfect contact to be obtained between the tires and the outer surface of the tube. This perfect contact, combined with the fact that the tires are presed against one another between the tube end plates, prevents any harmful displacement and rubbing of the pneumatic tires, liable to shorten the life span of the fender.

Moreover, because it is possible for very good contact to be achieved between the pneumatic tires and the outer surface of the tube, it is possible to obtain very good water-tightness between this surface and the interiors of the pneumatic tires. The pneumatic tires can therefore be filled with a suitable material so that the desired shockabsorbing effect can be obtained.

In addition, the fact that the cylindrical tube is filled with light concrete not only makes this tube rigid, which is essential so that perfect contact can be maintained between the pneumatic tires and the tube, but also allows the fender to be adapted to the desired buoyancy conditions.

According to an advantageous embodiment of the invention, the metal tube is filled with concrete comprising particles of a material selected from the following group: pumice, expanded polystyrene, rubber chips, balls of expanded glass.

According to a preferred embodiment of the invention, the pneumatic tyres are filled with rubber shavings or powder, also coming from worn pneumatic tires.

The rubber shavings or powder can be bonded together by means of an adhesive resistant to sea-water, such as an epoxy or polyurethane adhesive.

Also a synthetic foam resistant to sea-water can be injected into the interiors of the pneumatic tires which may or may not be filled with rubber shavings or powder. When this foam expands inside the pneumatic tires it has the effect of pressing the tires against one another and against the tube end plates.

Air can also be injected into the interiors of the tires, which are filled with rubber shavings or powder, at a pressure sufficient to press the tires together and against the tube end plates.

Other characteristics and advantages of the invention will also appear in the following description.

In the accompanying drawings which are given by way of non-restricting examples:

FIG. 1 is a longitudinal sectional view of a fender according to the invention secured to a quay wall;

FIG. 2 is a lateral view of the fender according to FIG. 1;

FIG. 3 is a partial longitudinal sectional view of the fender on a larger scale;

FIG. 4 is a similar view to FIG. 1 showing two tube-tire assemblies positioned one over the other;

FIG. 5 is a lateral view of the fender according to FIG. 4;

FIG. 6 is a diagrammatic view of a submerged fender with three tube tire assemblies disposed against the bulge at the bow of a ship;

FIG. 7 is a plan view of a fender adapted for a projecting angle on a quay wall.

In the embodiment of FIGS. 1 and 2, the fender device is secured against the side of a quay wall and comprises a cylindrical tube 2, for example of sheet steel, extending horizontally and filled with light concrete 3.

The tube 2 is protected externally by an anti-corrosive coating, for example, based on bitumen or epoxy resin, or by coating with metal (Zn-Al).

The light concrete 3 includes low density fillers, such as granules of pumice, particles of expanded polystyrene, rubber shavings, balls of expanded glass, etc. By lightening the concrete these fillers facilitate handling of the fender and give the fender the desired buoyancy properties. Worn truck tires 4, having an external diameter of approximately 1 m, for example, are disposed on the metal tube 2. The tires 4 are filled with a low density elastic material which will be described below.

The parts 4a of the tires 4 adjacent to the metal tube 2 are in close contact with the outer cylindrical surface of the tube. These parts 4a of the tires 4 are each closed off in a water-tight manner by a flexible sleeve 5 which is in contact with the outer surface of the tube 2. The sleeves 5 preferably consist of the rubber flaps which are normally disposed in contact with the rim of a truck tire in order to protect the air chamber. The sleeves 5 rest internally on the rims 4a of the tires, as can be seen in detail in FIG. 3.

The metal tube 2 is closed off at its ends by metal plates 6, 7 having a peripheral annulus 7a projecting with respect to the outer surface of the tube 2. The annuli 7a form stops for the tires 4 while protecting the sides of the tires.

The plate 6 is welded onto the end of the tube, while the plate 7 is secured in a detachable manner to the tube by means of angle irons 8 and bolts 9.

In one example of an embodiment, the elastic material 10 which fills the tires 4 consists of rubber shavings or powder coming from worn tires.

Due to the water-tightness achieves between the tires 4 and the external surface of the tube 2, there is no danger of the shavings or powder escaping outwards.

The shavings or powder may optionally be bonded by an adhesive resistant to sea-water, for example one which is latex- or polyurethane-based. The adhesive not only allows the desired elastic properties and shock-absorbing effect to be achieved, but also ensures perfect water-tightness of the interiors of the tires, while in particular closing off any possible pores in the tires.

The tires 4 can also be filled with a synthetic foam resistant to seawater such as an elastic epoxy or polyurethane foam, pressure-injected into the tires. Due to expansion of the foam taking place in situ inside the tires 4, the tires can expand while pressing against one another and against the peripheral annuli 7a. This expansion of the foam also has the effect of applying the sleeves 5 against the surface of the tube 2, thus ensuring excellent water-tightness. By the pressing of the tires 4 against one another and against the peripheral annuli 7a, displacement of the tires relative to one another can be prevented. Such displacement would bring about rubbing liable to damage the tires and the rust-proof coating on the tube 2.

Moreover it is also possible to inject air into tires filled with rubber shavings or powder at a pressure which may reach approximately 7 kg/cm².

The expanded foam may also be introduced into tires 4 already partially filled with rubber shavings or powder.

In all cases the elastic material present in the interiors of the tires 4 gives the fender excellent shock-absorbing ability as regards the rubbing and shocks exerted by ships.

The device according to the invention is secured in a horizontal position by means of two stowage chains 11 attached to the edge of the quay wall 1 and to rings 12 welded on to the rims of the end plates 6, 7 of the metal tube 2 (see FIGS. 1, 2 and 3).

These rings 12 are inclined with respect to the plates 6, 7 so as to hold the shackles 13 of the chains 11 spaced from the adjacent tires 4 and to prevent any contact with these tires liable to damage them. These shackles 13 may optionally be covered by a protective rubber sleeve (not shown) in order to prevent any direct contact between the shackles 13 and the tires 4 in case of lateral displacement of the fender under the effect of the swell when a ship comes alongside.

Moreover, each of the plates 6, 7 comprises a ring 14 disposed at 90° from the ring 12 and directed forwards. The ring 14 is used in handling the fender, for example by means of a crane. The positions of the rings 12 and 14 are chosen so that merely by action of gravity, they come into alignment with the coupling pins secured to the quay 1, which simplifies the operations of putting the fender in position and removing it.

In the embodiment of FIGS. 4 and 5, the fender according to the invention comprises two tube-tire assemblies disposed one over the other, the tires 4 of the two assemblies being in mutual contact. The two assemblies are connected to one another by rings 15 secured symmetrically to the plates 6, 7 with respect to the stowage rings 12. These rings 15 are linked with each other by means of shackles 16.

Due to this arrangement, the fender protects the hulls of ships, even in the case of variations in water level caused by the tides.

It will be understood that depending on the height of the tides, the fender may consist of more than two tube-tire assemblies.

Therefore the fender may consist of three tiered assemblies A, B, C as indicated in FIG. 6. Such a tiered fender not only guarantees protection in the case of substantial variations in water level but also protects the underwater bulge 17 called the "bulb" formed at the bow of a ship 18 positioned against the quay wall 1.

In the case of such a fender, it is advantageous to ballast the assembly by a block 19 of concrete or metal. Optionally this block 19 may rest on the sea bed.

In the embodiment of FIG. 7, the fender consists of two tube components 2a, 2b, connected together by an intermediate curved tubular portion 20. The fender fits therefore the projecting angle 21, the assembly being secured by chain at three points situated respectively at the free ends of the components 2a, 2b and at the intermediate portion 20.

It is, of course, possible to design a similar fender suitable for a re-entrant angle of a quay wall.

The various examples of quay fenders which have just been described are therefore suitable for the different conditions which may arise. In all cases the fenders guarantee effective protection agaist contact by ships' hulls. In addition, the fenders have a considerable life span in a submerged state. Furthermore, the fenders are not expensive, as substantial parts of them are formed from worn or used products (not destroyed ones), which raises the value of these products.

I claim:

1. A device for absorbing friction between ships and quay walls, comprising a series of worn pneumatic tires disposed against one another on an elongate body intended to be positioned substantially horizontally with respect to the quay wall, characterized in that the elongate body consists of a metal cylindrical tube filled with concrete lightened by low density fillers, the worn penumatic tires are filled with a low density elastic material, the parts of the tires adjacent to the metal tube are closed off in a substantially water-tight manner by flexible sleeves in contact with the metal tube, and in that the tube is closed off at its ends by plates which project with respect to the outer surface of the tube, these projections holding the assembly of tires pressed against one another.

2. A device according to claim 1, characterised in that the metal tube is filled with concrete comprising particles of a material selected from the following group: pumice, expanded polystyrene, rubber shavings and balls of expanded glass.

3. A device according to claim 1, characterised in that the tires are filled with rubber shavings or powder.

4. A device according to any of claims 1 to 3, characterised in that the tires are filled with rubber shavings or powder bonded by an adhesive resistant to sea-water.

5. A device according to any of claims 1 to 3, characterised in that the tires are filled under pressure with a synthetic foam resistant to sea-water, the pressure of the foam being sufficient to press the pneumatic tires against one another and against the tube end plates.

6. A device according to claim 3, characterised in that the pneumatic tires are also filled with air at a pressure sufficient to press them against one another and against the end plates of the tube.

7. A device according to claim 1, characterised in that said flexible sleeves are rubber sleeves or flaps resting internally on the rims of the tires.

8. A device according to claim 1, characterised in that one of the end plates is secured in a detachable manner to the metal tube.

9. A device according to claim 1, characterised in that the plates each comprise at least one ring so that the fender can be secured to the edge of the quay wall by means of chains.

10. A device according to claim 1, characterised in that each of the plates comprises a handling ring disposed at substantially 90° from the above-mentioned ring.

11. A device according to claim 1, characterised in that it comprises several tube-tire assemblies positioned one over another and connected together by rings carried by the end plates.

12. A device according to claim 1, characterised in that it consists of two tube components connected by means of a curved tubular portion so that the assembly can be suited to the angle of a quay wall.

13. A device according to claim 1, characterised in that the plates comprise a peripheral annulus forming a stop for the beading of the adjacent pneumatic tires.

* * * * *